(12) United States Patent
Chereshnev (10) Patent No.: US 11,514,345 B2
(45) Date of Patent: Nov. 29, 2022

(54) SYSTEMS AND METHODS FOR GENERATING AUTOMATED DECISIONS

(71) Applicant: Evgeny Chereshnev, London (GB)

(72) Inventor: Evgeny Chereshnev, London (GB)

(*) Notice: Subject to any disclaimer, the term of this patent is extended or adjusted under 35 U.S.C. 154(b) by 773 days.

(21) Appl. No.: 16/161,160

(22) Filed: Oct. 16, 2018

(65) Prior Publication Data

US 2019/0114551 A1   Apr. 18, 2019

Related U.S. Application Data

(60) Provisional application No. 62/573,414, filed on Oct. 17, 2017.

(51) Int. Cl.
*G06N 5/04* (2006.01)
*G06N 20/00* (2019.01)

(52) U.S. Cl.
CPC ............. *G06N 5/045* (2013.01); *G06N 20/00* (2019.01)

(58) Field of Classification Search
CPC ................................ G06N 5/045; G06N 20/00
See application file for complete search history.

(56) References Cited

U.S. PATENT DOCUMENTS

| | | | |
|---|---|---|---|
| 9,286,482 B1* | 3/2016 | Dumont | G06F 21/32 |
| 2010/0145807 A1* | 6/2010 | Kobres | G06F 21/6245 |
| | | | 705/26.1 |
| 2017/0140285 A1* | 5/2017 | Dotan-Cohen | G06F 9/453 |

OTHER PUBLICATIONS

Song, "Query-Less: Predicting Task Repetition for NextGen Proactive Search and Recommendation Engines", 2016 (Year: 2016).*
Daniele Quercia, "Recommending Social Events from Mobile Phone Location Data", IEEE, 2010 (Year: 2010).*

* cited by examiner

*Primary Examiner* — Ann J Lo
*Assistant Examiner* — Van C Mang (57) ABSTRACT

The subject disclosure relates to employing a computer-implemented method that sources, by a system operatively coupled to a processor, a set of personalized data comprising at least one of biometric data, statistical data, or contextual data. The method also includes determining, by the system, predictive relationships based on an evaluation of the set of personalized data. In another aspect, the method includes generating, by the system, a personal dynamic decision grid comprising a set of decision data coupled to a set of scores based on the predictive relationships, wherein the set of scores represent a probability of performing respective decisions of the set of decisions.

20 Claims, 4 Drawing Sheets

SYSTEMS AND METHODS FOR GENERATING AUTOMATED DECISIONS

CROSS-REFERENCE TO RELATED APPLICATION

This application claims priority to and claims the benefit of priority to U.S. Patent Application No. 62/573,414, filed on Oct. 17, 2017 and entitled "Private Artificial Intelligence". The entirety of the disclosure of the aforementioned application is considered part of, and is incorporated by reference in, the disclosure of this application.

BACKGROUND

Most modern computer-based services, platforms, and applications attempt to assist users by providing recommendations and suggestions to purchase an item, read an item, consumer content or perform other such activities based on trends associated with large populations of users. For instance, a large social platform may recommend a marketer to interact with a particular user based on trends associated with such users age, gender, and other such demographic information. However, such suggestions and recommendations are based on large population based trends and often don't resonate with the particular desires of user whom is comprised of idiosyncrasies and identity attributes that can't be characterized based on large demographic trends. Also, in current systems there is a glut of information provided to users in the form of advertising, spam, and other mass marketing messages. Often times such advertisements don't even satisfy what the user seeks.

Furthermore, such current platforms and technologies don't provide any meaningful assistance to a user throughout the day, but instead merely try to entice users to purchase a good or service. Also, a user's data is vulnerable in that it is stored on the organizations devices such as servers and networked devices that are susceptible to security breaches. Furthermore, the user data can be utilized by the organization in possession of such data for its own profitable uses such as selling to marketers or leading a user to perform an activity or conduct desired by the organization.

Also, users often perform digital processes in a similar and routine manner such that the same manual processes are employed reassuringly which requires the user to expend time, resources, and such processes are inherently inefficient. As such, there are needs for new technologies to address these problem areas related to conventional data souring technologies. In an aspect, system 100 facilitates the elimination of unwanted advertisements, news, spam messages, and the overall intensity of information that most users are bombarded with on a daily basis. Furthermore, system 100 facilitates the occurrence of routine automation tasks such as repetitive and systematic tasks a user conducts on a regular basis. The user can provide input data to system 100 that represents the approval of actions from time to time according in accordance with embedded policies that help system 100 cater to the user needs. Also, system 100 can improve the experience of a users interaction with the digital world by protecting the user and facilitating through the use of personalized data the user to improve development of himself as opposed to a third party product or service organization.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein are systems, devices, apparatuses, computer program products and/or computer-implemented methods that employ grouping components to group oil and gas exploration equipment failure data into one or more failure type groups and facilitate identification of equipment failure types.

According to an embodiment, a system is provided. The system comprises a processor that executes computer executable components stored in memory. The computer executable components comprise a sourcing component that sources a set of personalized data comprising at least one of biometric data, statistical data, or contextual data. In an another aspect, the system comprises a training component that determines predictive relationships based on an evaluation of the set of personalized data. Also in an aspect, the system comprises a first generation component that generates a personal dynamic decision grid comprising a set of decision data coupled to a set of scores based on the predictive relationships, wherein the set of scores represent a probability of performing respective decisions of the set of decisions.

In yet another aspect, the system further comprises a second generation component that generates a best practices grid based comprising a set of best practice decision data coupled to a set of best practice scores, wherein the best practices grid represents a set of optimal decisions corresponding to a target user sample. In another aspect, the system comprises a third generation component that generates a recommendation for performing a routine automation process based on a comparison of the set of decision data to the best practice decision data. Also in an aspect, the system comprises a recommendation component that either performs the routine automation process or provides a recommendation for performing the routine automation process.

According to another embodiment a computer-implemented method is provided. The computer-implemented method can comprise sourcing, by a system operatively coupled to a processor, a set of personalized data comprising at least one of biometric data, statistical data, or contextual data. Further, the computer implemented method can comprise determining, by the system, predictive relationships based on an evaluation of the set of personalized data. In another aspect, the computer-implemented method can generate, by the system, a personal dynamic decision grid comprising a set of decision data coupled to a set of scores based on the predictive relationships, wherein the set of scores represent a probability of performing respective decisions of the set of decisions. Also, the computer-implemented method can generate, by the system, a best practices grid based comprising a set of best practice decision data coupled to a set of best practice scores, wherein the best practices grid represents a set of optimal decisions corresponding to a target user sample. In another aspect, the computer-implemented method can generate, by the system, a recommendation for performing a routine automation process based on a comparison of the set of decision data to the best practice decision data. In yet another aspect, the computer-implemented method can perform, by the system, the routine automation process or providing, by the system, a recommendation for performing the routine automation process.

In addition, an appendix submitted herewith relates to various embodiments and/or features associated with the disclosed subject matter, and this appendix is considered part of this patent specification.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In an aspect, disclosed herein are devices, systems, and methods for utilizing personalized user data (e.g., biometric data, statistical data, social pattern data) that correspond to particular patterns of behavior of a user for use in determining decisions and performing predictive analysis operations. In an aspect, users generate data in several manners, for instance, the biological functions of such user provide a variety of information such as a user's heart beat at a particular instance in time or the number of steps a user takes to get to work. All such, biological functions and activities can have quantified via data. Furthermore, statistical data can be used to characterize typical user behaviors such as travel routes taken on a regular basis between frequently visited locations, typing error commonly executed when typing a document, and other such statistical types of data sets. In another aspect, social pattern data can represent information related to a users' social activities and social interactions.

As such, the personal user data comprising biometric data, statistical data, social pattern data, and other individualized data sets can be utilized to predict potential behaviors, activities, and decisions of a user. Furthermore, such predictive indicators can be utilized to facilitate the automated performance of various activities such as routine tasks (e.g., paying rent, booking plane tickets, etc.), behavioral advisory functions, routine communications, personality development advisory functions, physical or health development advisory functions, travel advisory functions, automation of several routines, functions to challenge a user, functions to manage a user finances, functions to automate the exchange of best practices between users, and other such tasks. In an aspect, the disclosure provides systems, methods and devices that can cut down the intensity of information provided to a user, perform automation of routine tasks, and facilitate self improvement activities of a user.

Figure 1:
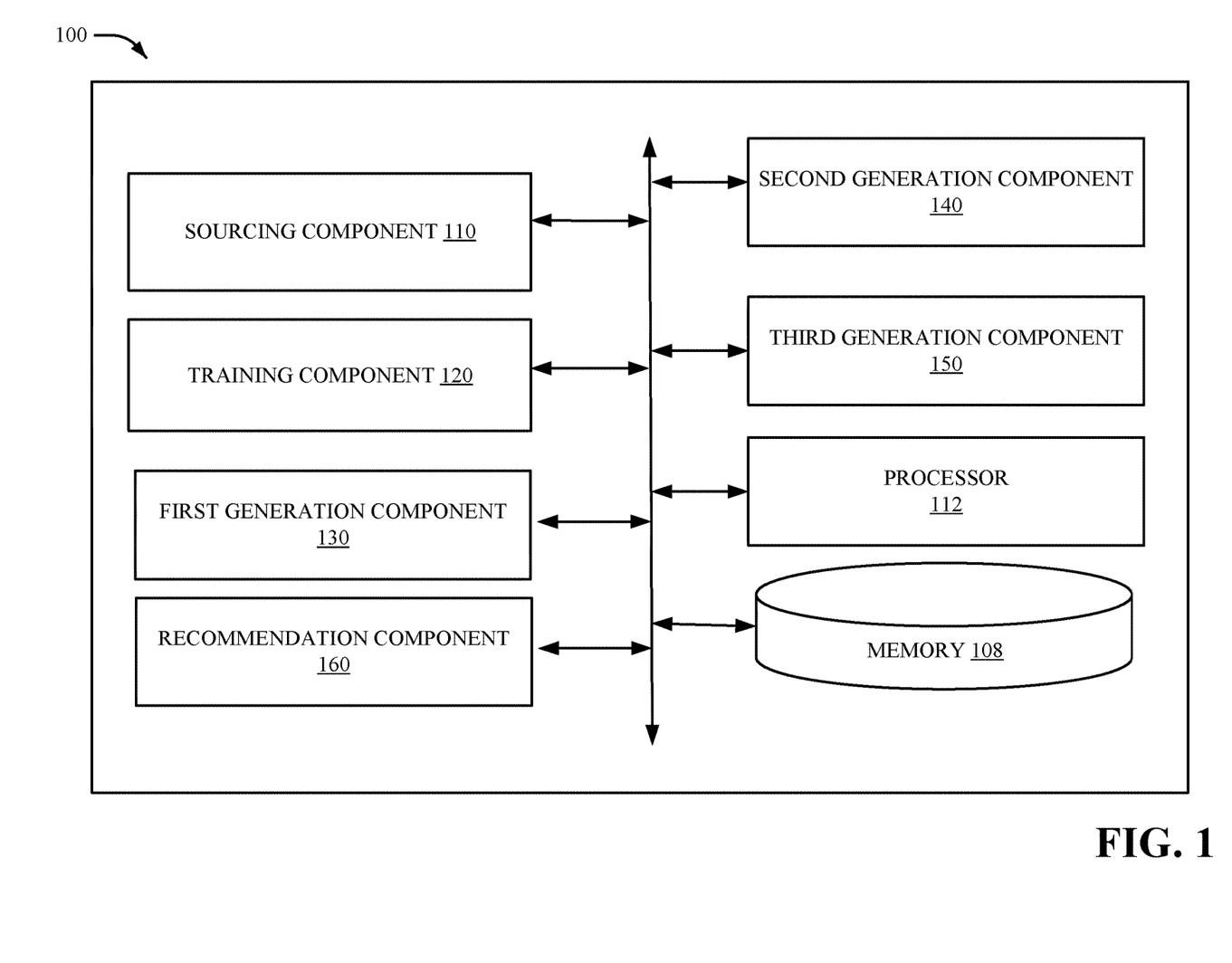
FIG. 1 illustrates a block diagram of an example, non-limiting system 100 that can facilitate a transmission of a recommendation based on personal artificial intelligence data in accordance with one or more embodiments described herein.

FIG. 1 illustrates a block diagram of an example, non-limiting system 100 that can facilitate a recommendation of routine automation processes or provide a recommendation for performing a routine automation process in accordance with one or more embodiments described herein. In an aspect, system 100 can include a memory 108 that stores computer executable components and a processor 112 that executes the computer executable components stored in the memory 108. In an aspect, the computer executable components of system 100 can comprise a sourcing component 110, a training component 120, a first generation component 130, a second generation component 140, a third generation component 140, and a recommendation component 150. In an aspect, the sourcing component 110 can source a set of personalized data comprising at least one of biometric data, statistical data, or contextual data.

In an aspect, personalized data refers to data that is associated with, controlled by and owned by a user. As such, the personalized data cannot be used by third party systems for evaluation and profiting (e.g., generating advertisements, messages, special offers, marketing communications, etc.) unless the user grants access to such data to the third party systems. Thus, the personalized data enables a user to reduce the intensity of information presented to such user on a regular basis (e.g., ads, spam, etc.). Furthermore, personalized data comprises biometric data, statistical data and social pattern data that is specifically sourced from a particular user. For instance, biometric data can represent a heart beat pattern, voice pattern or attribute (e.g., voice tone, frequency, lingual and speaking uniqueness), vein pattern (e.g., static), walking pattern (sourced using a sensor such a gyroscope within a device), metabolic data (e.g., levels of serotonin, endorphins and other hormones), gestures (e.g., data representing the angle, speed and manner in which a user uses different muscles, strength, etc. while waving for instance), waking and/or sleeping patterns (e.g., longitudinal sleep patterns).

In another embodiment, although a user can grant access to data to third party systems, the user can be incentivized to provide access to respective systems in order to receive the capability of performing particular operations (e.g., extra features or capabilities) or receiving particular benefits (e.g., discounts or money, etc.) and such access can be granted in return for a subscription to such third party systems. In yet another embodiment, the user can grant third parties access to a very specific subset of data based on the third parties requests and requirements. For instance, a user can provide data to support or evidence the answers to questions such as whether the user smokes and a third party system such as an insurance company can generate a score based on the data supporting these response types (e.g., in addition to other tests such as a DNA analysis for instance) to predict the life expectancy of the user using such statistics and data. As such, the insurance provider can perform more accurate underwriting activities and offer a better life insurance policy to the user.

Accordingly, personalized data that is biometric data can represent attributes of a user that are unique to only such user. Furthermore, as the accumulation (e.g., by a device configured to source or generate such data such as a digital DNA device) of data increases, the personalization, uniqueness and customization of the data patterns become more specific to such user. For instance, an accumulation of heart beat data over one week can indicate a users' heart beat over a period of time and match a sample of heart beat data to the users set of heart beat data over that one week to identify whether the sample of heart beat data belongs to the user. However, a comparison of the sample of heart beat data to a set of heart beat data representing one year's worth of heart beat data of the user can provide a more accurate indication of whether the sample heart beat data belongs to the user. For instance, there are more scenarios that a user may be exposed to that effect heart beat rate and speed metrics. As such, the sample data can be compared to segments of data from many heart beat data scenarios within the one-year window more so than the one-week scenario.

In another aspect, the personalization data can include statistical data representing user personal data in some instances. For instance, statistical data can represent a user moving habits as indicated by Global Positioning Satellite (GPS) data. In an aspect, the statistical data can also represent a user moving habits by utilizing one or more of GPS, a GPS-based triangulation mechanism to identify a users' location and movements, and/or a Point-to-point positioning system. For instance, the GPS-based triangulation mechanism (in connection with GPS) can detect the location of a cellular signal, radio transmitter signal, or GPS broadcast signal emitted from a device (e.g., user mobile device) based on a measurement of a distance or direction of a received signal from two or three different points. In an aspect, the signal can be received by several base stations (e.g., cellular tower, short-range transceiver allowing a connection to a network, relay, etc.) to pinpoint the geographic position of a user device (e.g., and therefore a user) as well as the movements of such user device. Furthermore, in another non-limiting embodiment, the GPS-based triangulation mechanism can be utilized in connection with a Point-to-Point based mechanism to detect the location of a user in traditionally difficult to detect locations such as at an underground shopping mall.

In other instances, statistical data can represent typing characteristic data (e.g., data representing typical or frequent typos of a user, typical vocabulary used by a user, etc.), search history data and/or patterns, typical service use data (e.g., period of time using particular applications and services, frequency of use of various applications, typical features used with respective applications and services, etc.), user interest data (e.g., areas of interest such as cars, sports, travel, books, films, etc.), typical response data (e.g., manner and trends in responses to questions, comments, messages (e.g., chats, emails, social media, etc.), typical mark data passed in the internet of things environment (e.g., information about the time a user leaves the apartment each day, the time a user arrives at the office on most days, most frequently asked questions to AI-driven digital personal assistants, etc.), typical travel statistic data (e.g., user travels from Munich to Boston every Christmas holiday and three other times per year, the user never travels to India), and other such statistical data that represents a users patterns in performing day to day activities.

In yet another aspect, the personalization data can comprise social pattern data that represents payment habit data (e.g., how much a user spends, what items a user purchases, the regularity of common and uncommon user purchases, frequently used ecommerce providers, wallet and currencies of choice, travel habit information including countries and cities and hotels frequented, etc.), talking habit data (e.g., users vocabulary, speaking style, tone of voice, and other talking attributes used in particular environments), reading habit data (e.g., the type, author, genre and other attributes of books that a user reads including a tree of books being generated), learning habit data (e.g., disciplines or specific knowledge acquired by a user over time), fitness habit data (e.g., work out routines, intensity of exercising occurring, etc.), dating habit data (e.g., the places a user visits for dates, the frequency in which date nights occur, the duration of most dates, etc.), and other such social pattern data.

Accordingly, personalization data includes a wide array of data that represents patterns and information specific to a particular user which can be utilized within system 100 for purposes of assisting such users perform daily routine activities, keep such data within the ownership and protection frameworks of the user (e.g., such data does not need to be shared or provided to third parties and is solely used for the benefit of only the user/owner), perform self improvement and self development tasks. Accordingly, the personal artificial intelligence system can utilize such data to assist the user in all aspects of life (e.g., career advancement, performance of tasks, encapsulating personal identity, etc.). As such, sourcing component 110 sources the set of personalized data via various mechanisms such as sensors, devices (e.g., digital DNA device), mobile devices, fitness bands and other such devices employing processor 112 to execute sourcing component 110.

In an aspect, sourcing component 110 can source such data in structured and unstructured formats. Furthermore, sourcing component 110 can source such data from several data sources including storage devices (e.g., servers, cloud networks, databases, data stores, etc.) and such data can be organized in integrated formats, stand alone formats, and in several classification frameworks. For instance, biometric data, statistical data, and social pattern data can respectively be wrapped within corresponding encrypted wrappers (e.g., blocks of a block chain, storage mechanisms, etc.) and then be integrated (e.g., coupling data, pairing data, etc.) at a virtual database for use in respective system operations (e.g., performing routine operations, etc.).

In another aspect, system 100 can employ processor 112 to execute training component 120 that determines predictive relationships based on an evaluation of the set of personalized data. In an aspect, the predictive relationships between subsets of data of the personalized data can include the use of data to predict decisions a user would make with a high probability. For instance, a subset of personalized data can indicate that every Thanksgiving a user books plane tickets from location A to location B within a price range with a low end spanning X and a high end spanning Y. As such, training component 120 in connection with sourcing component 110 can source relevant data representing historical transactional information and decision processes associated with such transaction to automate the booking of such flight automatically.

In another aspect, system 100 can employ processor 112 to execute first generation component 130 that can generate a personal dynamic decision grid comprising a set of decision data coupled to a set of scores based on the predictive relationships (e.g., determined by training component 120), wherein the set of scores represent a probability of performing respective decisions of the set of decisions. As such, the generated personal dynamic decision grid can include a matrix (e.g., rows and columns) that store values and information related to a likelihood or probability that a decision is optimal based on one or more given criterion, variable or assumption. As such, processor 112 can execute first generation component 130 to analyze a series of alternative decision options and determine the decision that has the highest probability of achieving a desired outcome for the user. In another aspect, each alternative decision option can be assigned a score that represents a probability that a respective decision is optimal.

For instance, the user whom always travels from location A to location B may be presented with several flight options that fall within a price range of low end X and high end Y, however, each several options may occur during an inconvenient time frame and may include indirect flight options. As such, first generation component 130 can generate scores based on data representing those attributes (e.g., indirect flights, flight timings, etc.) that reflect a lower or higher probability that the user would select such flight option. Furthermore, the scores associated with each decision can be ranked to better review the alternatives and its relevance to the decision the user would typically make. For instance, a first score can be assigned to decision data that represents an indirect flight with two layovers and a second score can be assigned to decision data that represents a direct flight between location A and location B. In an aspect, system 100 can rank the first score lower than the second score therefore indicating that the first decision is a better fit than the second decision.

In another aspect, the data that is sourced by sourcing component 110 can be organized by data markers to facilitate determination activities (e.g., using training component 120) and generation activities (e.g., using first generation component 130) performed by system 100. In an aspect, the sourced data can be organized by data markers that correlate the data with various markers such as time markers, location markers (e.g., using GPS sensors), and decisions of interest data markers (e.g., indicating that particular data subsets are useful in determining a particular decision by a user). In another aspect, sourced data (e.g., using sourcing component 110) can facilitate the gathering of user data (e.g., biometric, statistical, social pattern data, etc.) for creating math vector data representative of potential behaviors. For instance, a vector can represent a connection between a data point representing an attribute or variable that contributes to a decision. Furthermore, such attribute can be connected to a data point associated with such decision in order to form a vector that connects such attribute to such decision. Furthermore, many other attributes (e.g., tangential or direct) can be represented by data points and connected to the decision data point until there are trends and patterns that can be derived in association with each decision that can be utilized for evaluation of a predictive pattern that leads to a decision.

In an aspect, embodiments of systems described herein can include one or more machine executable components embodied within one or more machines (e.g., one or more computer-readable storage media associated with one or more machines). Such components, when executed by the one or more machines (e.g., processors, computers, computing devices, virtual machines, etc.) can cause the one or more machines to perform any of several operations such as routine tasks described herein. In an aspect, system 100 can utilize a machine learning task of inferring a function or performance of a routine task associated with a decision based on labeled training data. The training data can comprise a set of training examples. In an aspect, a supervised learning technique can be employed by system 100 to pair an input object (e.g., a vector) and a desired output value (e.g., a supervisory signal) such that a supervised learning algorithm can analyze the training data and produce an inferred function that can map to new examples. As such, the learning algorithm can generalize from training data to various unanticipated or unseen situations in a reasonable way. Accordingly, system 100 can employ machine learning techniques (including those utilizing vectors) to facilitate the performance of decisions that assist a user in day to day life.

In another aspect, first generation component 130 can utilize the vectors to form a dynamic algorithm that generates a tree of potential decisions a user may perform. As such, the dynamic algorithm can be utilized by generation component 130 to determine the decision that has the highest probability of fitting a users typical decision given various variables. Pursuant to such dynamic algorithm, system 100 can automate most routine decisions that are highly predictable such as paying rent (e.g., when to pay rent, how much to pay, where to transmit such payment) based on such machine learning techniques, the use of sourced personalized data, using vector relationships, and using the decision matrix.

In an aspect, system 100 can employ a recommendation component 160 that employs a recommendation that either performs a routine task based on a generated decision or recommends a particular task to a user (e.g., at a user interface of a device) that is optimal at a given point in time. In an aspect, system 100 can propose to perform decisions that include the performance of behavioral functions, routine activities, routine communication automation, personality development advisory functions, physical health development and advisory functions, travel advisory functions, automation of several routines, challenges to user function, management of user financing functions, and automation of best practices exchange.

Accordingly, system 100 can perform a behavioral advisory operation that represents advice to a user on an optimal behavior or situation upon which the user should make a decision. For instance, system 100 can source data (e.g., using sourcing component 110) that indicates bitcoin has been chosen as a currency for acceptance by half of the Fortune 100 organizations internationally, and as such recommends (e.g., using recommendation component 160) that the user purchase bitcoin. Furthermore, system 100 can suggest not performing such purchase of bitcoins from a particular country because it is illegal, but rather proscribes a mechanism to legally purchase the digital currency (e.g., using an overseas account and an overseas credit card). As such, system 100 can determine and recommend an optimal decision for the user to possibly execute while also proscribing the steps to undertake in order to execute such decision.

In another aspect, system 100 can perform a routine activity automation operation such as performing payments for everyday items (e.g., gas bills, electricity, cable bill), prepare tax return documents, perform routine purchases (e.g., toothpaste, water, washing soap, etc.). In an aspect, system 100 can employ components to perform routine activity automation and automate routine communications such as transmitting work emails, marketing emails, and other such forms of communication. For instance, system 100 can utilize word pattern data to facilitate an execution of communication operations such as transmitting a master email list, special offers, and other marketing communication. In another instance, system 100 can also transmit communications on behalf of a user and represent such users' interests. Furthermore, system 100 can perform operations that utilize sourced data to determine and filter away harassing advertisements or invasive advertisements.

In another aspect, system 100 can perform negotiation operations with various devices based on decisions (as per the decision matrix).

In another aspect, system 100 can execute tasks corresponding to activities related to personality development of a user. For instance, in an aspect, system 100 can employ recommendation component 160 to recommend functions for a user to perform related to a development of personal skills such as various book types, courses to attend, items to practice, hobbies to attempt, and other items for delivery of an optimal personality development activity. In yet another aspect, system 100 can employ system components to execute physical and/or health development advisory tasks. For instance, in an aspect, system 100 can employ components that recommend (e.g., recommendation component 160) optimal daily/weekly exercise routines to reach specific goals. As a non-limiting example, a device (e.g., pedometer) or sensor (e.g., gyroscope, heartbeat sensor, etc.) can utilize biometric data to source and evaluate biometric data in order to match such data with respective developmental goals set forth by the user.

In another aspect, system 100 can employ system 100 and recommendation component 160 to generate recommendation data that represents advisory actions on travel that the user can select. For instance, the system can evaluate old travel booking data and determine pricing to same locations in association with current ticket booking such that the user can be able to obtain best pricing for airfare to desired locations. Furthermore, the system can automatically book such desirable tickets based on whether the user wants such booking routine automated. In another aspect, system 100 can automate several other everyday routines or activities of a user based on a sourcing and evaluation of personalized data of the user. For instance, system 100 can perform automatic hotel booking operations, car rental booking operations, restaurant booking operations, tour prepaying operations, and other such routine tasks based on an evaluation of the personalized data.

In another aspect, system 100 can execute tasks corresponding to activities related to expanding the personality development of a user outside of a typical personality pathway or challenge a user beyond what the user would typically undertake. For instance, system 100 can transmit recommended (e.g., using recommendation component 160) book data (e.g., representing unusual or challenging books), task data (e.g., representing unusual or challenging tasks), quest data (e.g., representing unusual or challenging tasks), and other such opportunities for a user to select in order to expand its personality development. In another aspect, system 100 can execute tasks corresponding to managing a users' finances such as utilizing personalized data to assist a user in managing financial data (e.g., representing keeping and maintaining financial records), optimizing business book data (e.g., suggesting tax favoring opportunities, making use of financial tools to maximize profits, etc.).

In yet another aspect, system 100 can employ processor 112 to execute a second generation component 140 that generates a best practices grid comprising a set of best practice decision data coupled to a set of best practice scores, wherein the best practices grid represents a set of optimal decisions corresponding to a target user sample. In an aspect, the generation component 140 can generate anonymized data related to the personalized data, wherein the anonymized data represents best practices associated with a self-learning neural network. However, in an instance, the user owns the anonymized data, the data is no sold or provided to a third party, and system 100 facilitates the ability to make decisions (based on the personalized data and best practices data) that are focused on a users' preferences rather than an advertiser's preference.

In an aspect, system 100 can utilize a neural network processing component to store and/or update weights associated with the decision grid and the best practices grid to determine patterns using specialized computer(s) employing specialized instructions for implementing one or more features or actions performed by a computer neuron. In an aspect, system 100 can implement machine learning systems, deep learning systems and/or other artificially intelligence based training systems to source data for use in the neural network. In another aspect, system 100 can employ discrete and differentiated tasks and subtasks in order to arrive at a determination or a decision.

In an aspect, system 100 performs tasks to source (e.g., using sourcing component 110) personalized data that is owned and produced by the user. A user can allow for system 100 to source data from social media accounts, email accounts, and other third party systems in order to source more unique feeds of data, however, the personalized data will not be transmitted to a third party unless the user explicitly directs system 100 to transmit such data. In another aspect, the data sourcing provided by system 100 is not utilized to optimize third party services or products for the users' consumption or purchase. Instead, the personalized data is solely used to generate operations that serve only the user and acts as a digital extension of the user to execute daily acts and mental processes in life. In a non-limiting embodiment, the personalized data does not transmit to an unencrypted cloud infrastructure but rather a current subset of personalized data is stored on a device (e.g., Digital DNA) and the remaining data (past and recent data that can support the generation of scores) can be stored within an encrypted container (e.g., an encrypted cloud infrastructure).

In an aspect, the device employing system 100 can store personalized data associated with all the user activities, tasks and operations within the previous forty-eight-hour time period as well as associated scores with older data subsets that can be utilized by the device and system 100 to execute various decisions (e.g., routine decisions). As such, score data associated with previously generated personalized data subsets that is present on the device can be integrated with new personalized data to generate new scores (given the new streams of personalized data), determining new scores, and making new decisions. In another aspect, the score data present on the device can represent summarized data of all previous personalized data (e.g., representing past events) and such summarized data can be combined with new data. In another aspect, a users identity represented by the personalized data can be stored on a block chain and this stored personalized data can be used as a dynamic pattern for continuous generation of scores.

Furthermore, in an embodiment, new personalized data can be continuously stored on the device employing system 100 and older personalized data can be moved into long term storage (e.g., on the block chain or encrypted cloud), while the scores representing summarized data can be continuously recalculated and changing as it is impacted by new incoming personalized data. Overall, system 100 provides a system that enables a sourcing of personalized data (e.g., using artificial intelligence techniques) that is centered around the user as the sole owner of the data and to whom such data belongs. In an aspect, the generated data can be precluded from use by a company, brand, advertiser, or other such organization. The data can allow the user behavior (e.g., via data) to be analyzed in order to recommend an optimal behavior to improve or better the user in several areas including, but not limited to health (e.g., achieving a health goal), lifestyle regimes (e.g., system 100 can generate advisor data based on personalized data in accordance with expert recommendations and best practices), undertaking effective education (E.g., best next moves based on current results), taking medicine, automating routine tasks (e.g., paying bills, filing taxes, etc.), automating shopping (e.g., most common purchases can be automatically performed), cybersecurity implications for enterprise and governments organizations (e.g., system 100 and personalization data can act as a cybersecurity advisor or protector to observe normal behaviors and block anything that can harm a user), travel (e.g., system 100 can optimize routes and exchange routes to provide better travel infrastructure to a user), legal activities (e.g., system 100 can facilitate a users compliance with a request for legal compliance by transmitting personalized data subsets in accordance with a request, court order, warrant, etc.) such that a user can submit only relevant data to comply with legal requests for information (while the remaining data pertaining to the user life is protected), perform anti-spam and messaging automation operations (e.g., system 100 can transmit messages to third parties without user involvement, report an alert to a user when a user-based decisions is required such as renewal of a car lease or choosing between vehicle models based on pros and cons, etc.), and performing advertisement management tasks (e.g., system 100 can determine those offers that are relevant to a user and case relevant and hide all those advertisements that are not based on the personalized data or present an offer to a user to make a decision such as a purchase).

In view of the example systems and/or devices described herein, example methods that can be implemented in accordance with the disclosed subject matter can be further appreciated with reference to flowcharts in FIG. 1. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein.

For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 2:
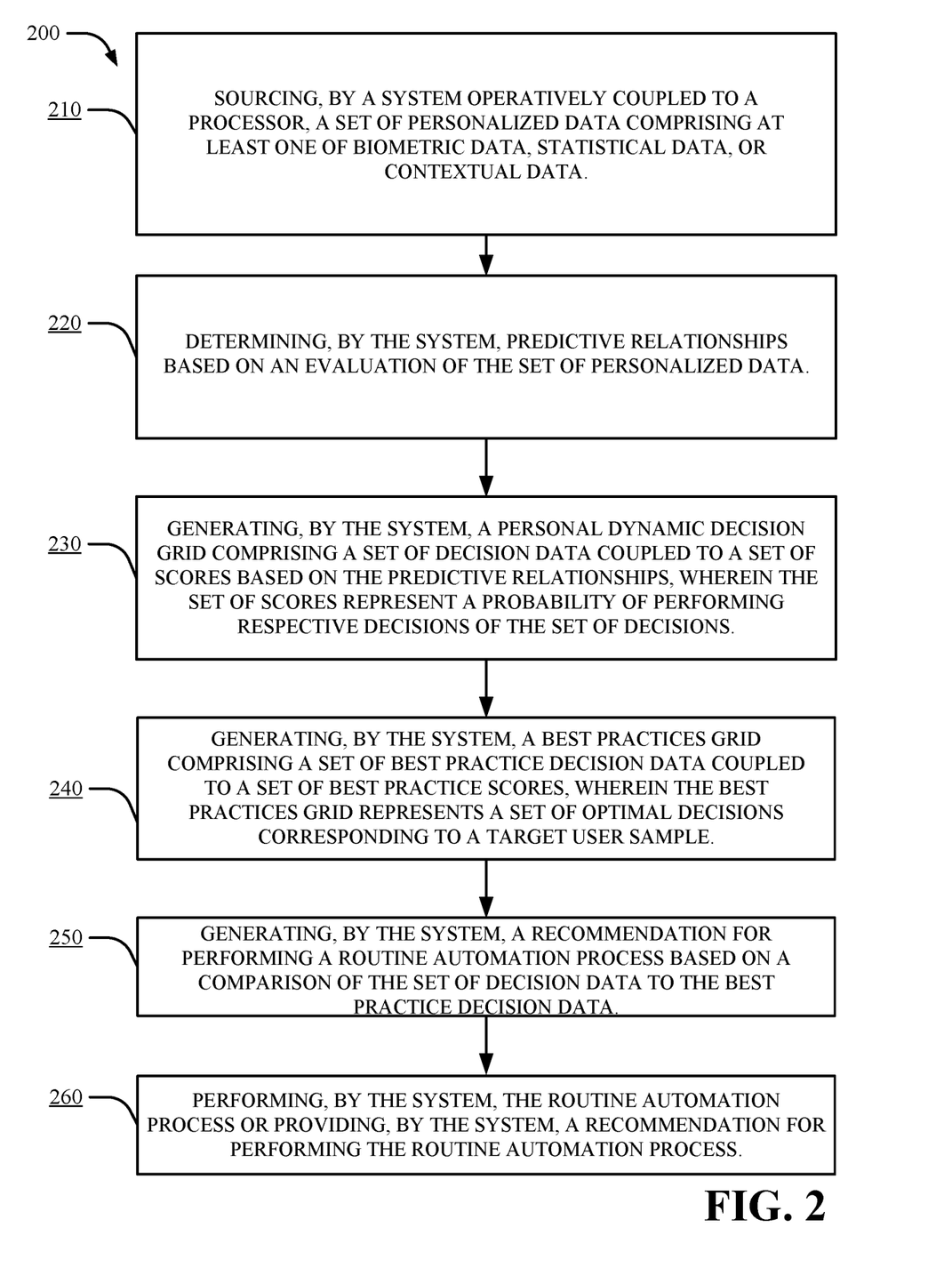
FIG. 2 illustrates a block diagram of an example, non-limiting method 200 that can facilitate a transmission of a recommendation based on personal artificial intelligence data in accordance with one or more embodiments described herein.

FIG. 2 illustrates a flow chart of an example, non-limiting method 200 that can facilitate a transmission of a recommendation based on personal artificial intelligence data in accordance with one or more embodiments described herein. At 210, a system operatively coupled to a processor, sources a set of personalized data comprising at least one of biometric data, statistical data, or contextual data. At 220, the system can determine predictive relationships based on an evaluation of the set of personalized data. At 230, the system can generate a personal dynamic decision grid comprising a set of decision data coupled to a set of scores based on the predictive relationships, wherein the set of scores represent a probability of performing respective decisions of the set of decisions.

At 240, the system can generate a best practices grid comprising a set of best practice decision data coupled to a set of best practice scores, wherein the best practices grid represents a set of optimal decisions corresponding to a target user sample. At 250, the system can generate a recommendation for performing a routine automation process based on a comparison of the set of decision data to the best practice decision data. At 260, the system can perform the routine automation process or provide a recommendation for performing the routine automation process.

Aspects disclosed herein can be integrated with the tangible and physical components of a computer hardware and software components. In another aspect the systems and methods disclosed can be integrated with physical devices such as digital DNA sourcing devices, tablets, desktop computers, mobile devices, and other such hardware. Furthermore, the ability to employ iterative machine learning techniques to categorize personalized data associated with several data sources and technologies simultaneously cannot be performed by a human. For example, a human is unable to group biological data, statistical data and contextual data from several data sources simultaneously based on machine learning and artificial intelligence comparative techniques in an efficient and accurate manner.

Figure 3:
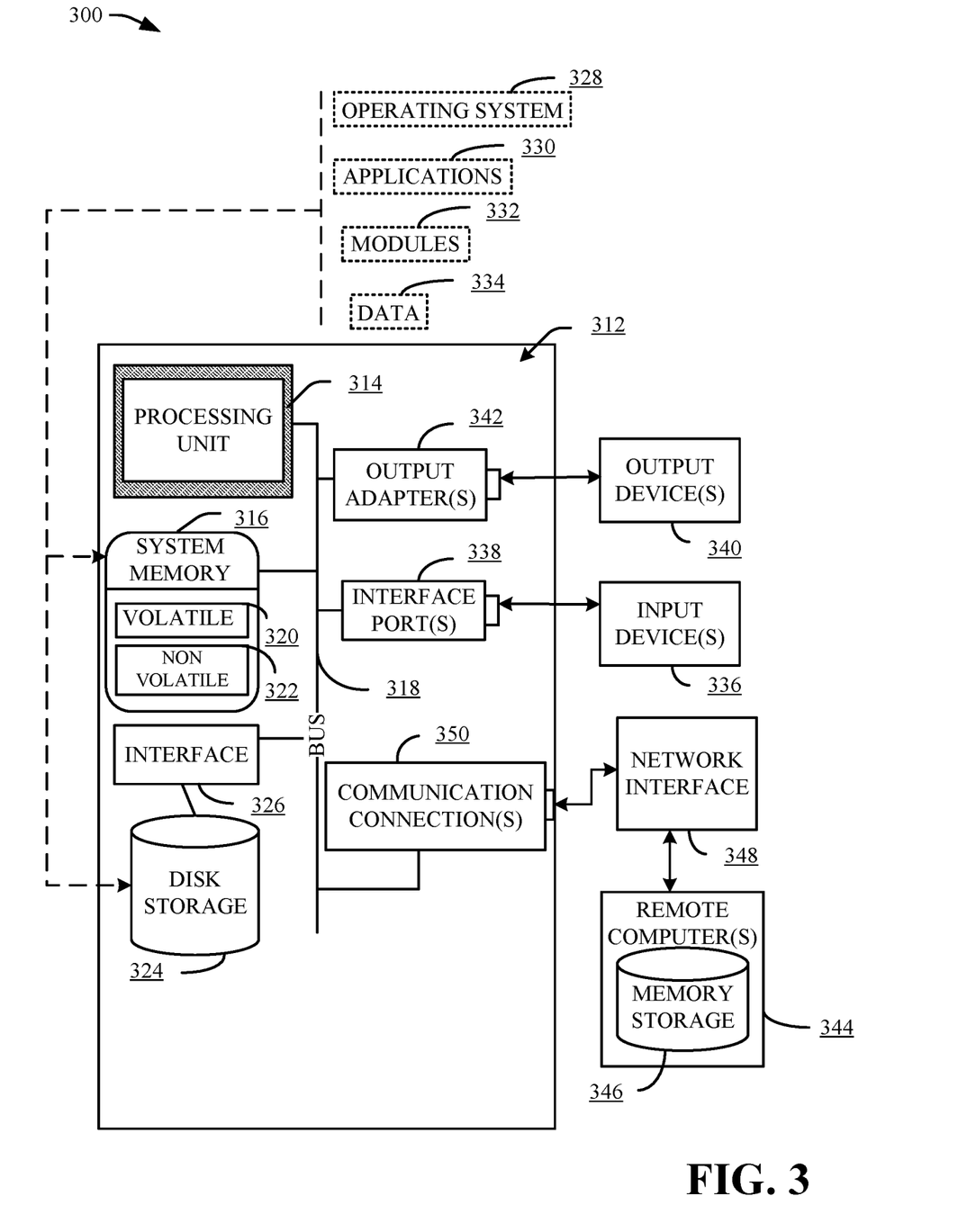
FIG. 3 illustrates a block diagram of an example, non-limiting operating environment 1600 in which one or more embodiments described herein can be facilitated.

In order to provide a context for the various aspects of the disclosed subject matter, FIG. 3 as well as the following discussion is intended to provide a general description of a suitable environment in which the various aspects of the disclosed subject matter can be implemented. FIG. 3 illustrates a block diagram of an example, non-limiting operating environment in which one or more embodiments described herein can be facilitated. With reference to FIG. 3, a suitable operating environment 300 for implementing various aspects of this disclosure can also include a computer 312. The computer 312 can also include a processing unit 314, a system memory 316, and a system bus 318. The system bus 318 couple's system components including, but not limited to, the system memory 316 to the processing unit 314. The processing unit 314 can be any of various available processors. Dual microprocessors and other multiprocessor architectures also can be employed as the processing unit 314. The system bus 318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 316 can also include volatile memory 320 and nonvolatile memory 322. The basic input/output system (BIOS), containing the basic routines to transfer information between elements within the computer 312, such as during start-up, is stored in nonvolatile memory 322. By way of illustration, and not limitation, nonvolatile memory 322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 320 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 312 can also include removable/non-removable, volatile/non-volatile computer storage media. FIG. 3 illustrates, for example, a disk storage 324. Disk storage 324 can also include, but is not limited to, devices like a magnetic disk drive, floppy disk drive, tape drive, Jaz drive, Zip drive, LS-100 drive, flash memory card, or memory stick. The disk storage 324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 324 to the system bus 318, a removable or non-removable interface is typically used, such as interface 326. FIG. 3 also depicts software that acts as an intermediary between users and the basic computer resources described in the suitable operating environment 300. Such software can also include, for example, an operating system 328. Operating system 328, which can be stored on disk storage 324, acts to control and allocate resources of the computer 312.

System applications 330 take advantage of the management of resources by operating system 328 through program modules 332 and program data 334, e.g., stored either in system memory 316 or on disk storage 324. It is to be appreciated that this disclosure can be implemented with various operating systems or combinations of operating systems. A user enters commands or information into the computer 312 through input device(s) 336. Input devices 336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 314 through the system bus 318 via interface port(s) 338. Interface port(s) 338 include, for example, a serial port, a parallel port, a game port, and a universal serial bus (USB). Output device(s) 340 use some of the same type of ports as input device(s) 336. Thus, for example, a USB port can be used to provide input to computer 312, and to output information from computer 312 to an output device 340. Output adapter 1242 is provided to illustrate that there are some output device 340 like monitors, speakers, and printers, among other such output device 340, which require special adapters. The output adapters 342 include, by way of illustration and not limitation, video and sound cards that provide a means of connection between the output device 340 and the system bus 318. It should be noted that other devices and/or systems of devices provide both input and output capabilities such as remote computer(s) 344.

Computer 312 can operate in a networked environment using logical connections to one or more remote computers, such as remote computer(s) 344. The remote computer(s) 344 can be a computer, a server, a router, a network PC, a workstation, a microprocessor based appliance, a peer device or other common network node and the like, and typically can also include many or all of the elements described relative to computer 312. For purposes of brevity, only a memory storage device 346 is illustrated with remote computer(s) 344. Remote computer(s) 344 is logically connected to computer 312 through a network interface 348 and then physically connected via communication connection 350. Network interface 348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 350 refers to the hardware/software employed to connect the network interface 348 to the system bus 318. While communication connection 350 is shown for illustrative clarity inside computer 312, it can also be external to computer 312. The hardware/software for connection to the network interface 348 can also include, for exemplary purposes only, internal and external technologies such as, modems including regular telephone grade modems, cable modems and DSL modems, ISDN adapters, and Ethernet cards.

Figure 4:
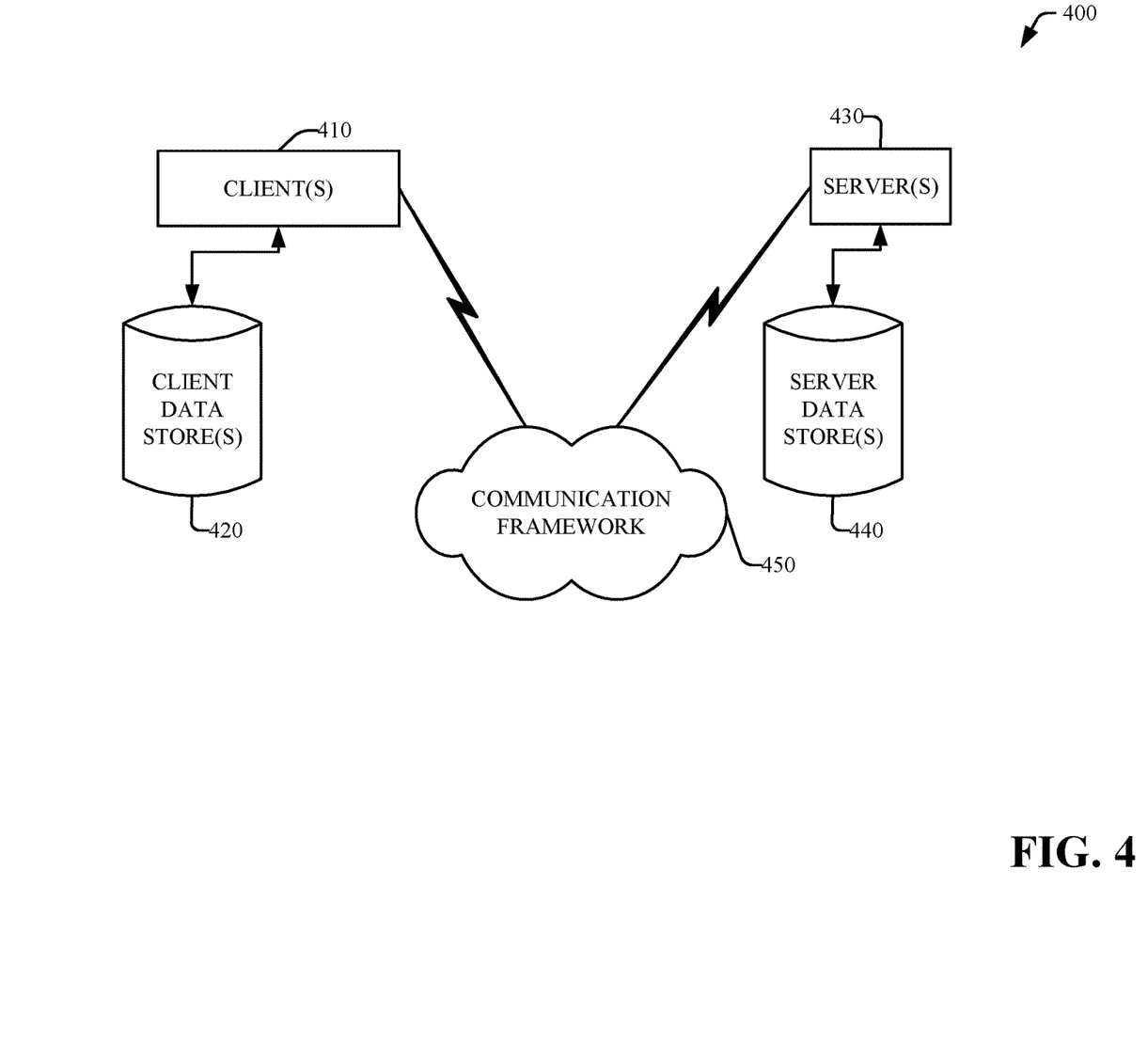
FIG. 4 illustrates a block diagram of an example, non-limiting operating environment 1700 in which one or more embodiments described herein can be facilitated.

Referring now to FIG. 4, there is illustrated a schematic block diagram of a computing environment 400 in accordance with this disclosure. The system 400 includes one or more client(s) 402 (e.g., laptops, smart phones, PDAs, media players, computers, portable electronic devices, tablets, and the like). The client(s) 402 can be hardware and/or software (e.g., threads, processes, computing devices). The system 400 also includes one or more server(s) 404. The server(s) 404 can also be hardware or hardware in combination with software (e.g., threads, processes, computing devices). The servers 404 can house threads to perform transformations by employing aspects of this disclosure, for example. One possible communication between a client 402 and a server 404 can be in the form of a data packet transmitted between two or more computer processes wherein the data packet may include video data. The data packet can include a metadata, e.g., associated contextual information, for example. The system 400 includes a communication framework 406 (e.g., a global communication network such as the Internet, or mobile network(s)) that can be employed to facilitate communications between the client(s) 402 and the server(s) 404.

Communications can be facilitated via a wired (including optical fiber) and/or wireless technology. The client(s) 402 include or are operatively connected to one or more client data store(s) 408 that can be employed to store information local to the client(s) 402 (e.g., associated contextual information). Similarly, the server(s) 404 are operatively include or are operatively connected to one or more server data store(s) 410 that can be employed to store information local to the servers 404. In one embodiment, a client 402 can transfer an encoded file, in accordance with the disclosed subject matter, to server 404. Server 404 can store the file, decode the file, or transmit the file to another client 402. It is to be appreciated, that a client 402 can also transfer uncompressed file to a server 404 and server 404 can compress the file in accordance with the disclosed subject matter. Likewise, server 404 can encode video information and transmit the information via communication framework 406 to one or more clients 402.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable instructions;
at least one processor coupled to the memory, that facilitates execution of the executable instructions to perform operations, comprising:
generating, by the at least one processor, a personalized learning system configured to facilitate decisions and execute automated tasks corresponding to a user profile, wherein the generating the personalized learning system comprises:
sourcing, by the at least one processor, a set of personalized data comprising at least one of biometric data, statistical data, or contextual data from at least one device comprising a processor, wherein access to the set of personalized data is controlled by a user profile;
creating, by the at least one processor, a first training set of historical decisions executed by the user profile, wherein the first training set comprises a first subset of the set of personalized data and associated decision processes;
training, by the at least one processor, an iterative machine learning model to predict decisions of the user profile based on the first training set;
determining, by the at least one processor, predictive relationships between subsets of the set of personalized data and events corresponding to the user profile based on learned relationships, by execution of the iterative machine learning model trained on the first training set, between the subsets of the set of personalized data and historical events corresponding to the user profile;
generating, by the at least one processor, a personal dynamic decision grid configured to score the predictive relationships between unforeseen events and predictive decisions of the user profile, wherein the scores represent a probability of performing respective decisions of the predictive decisions;
generating, by the at least one processor, a customized decision comprising a set of practice decision data coupled to a set of practice scores, wherein a practice grid represents a set of final decisions corresponding to a target user sample;
generating, by the at least one processor, an automated recommendation decision for the user profile to perform a routine automation process or at least one step in the routine automation process, wherein the automated recommendation decision is inferred based on execution of another machine learning model configured to map the set of practice decision data to the set of final decisions; and
automatically, by the at least one processor, performing the routine automation process based on the automated recommendation decision.

2. A computer-implemented method, comprising:
generating, by a processor coupled to a memory, a personalized learning system configured to facilitate decisions and execute automated tasks corresponding to the user profile, wherein the generating the personalized learning system comprises:
sourcing, by the processor, a set of personalized data comprising at least one of biometric data, statistical data, or contextual data from at least one device comprising another processor, wherein access to the set of personalized data is controlled by a user profile;
determining, by the processor, predictive relationships between subsets of the set of personalized data representing training data and events corresponding to the user profile based on learned relationships, by execution of an iterative machine learning model trained based on the training data, between the subsets of the set of personalized data and historical events corresponding to the user profile;
generating, by the processor, a personal dynamic decision grid configured to score predictive relationships between unforeseen events and predictive decisions of the user profile, wherein the scores represent a probability of performing respective decisions of the predictive decisions;
generating, by the processor, a customized decision comprising a set of practice decision data coupled to a set of practice scores, wherein a practice grid represents a set of final decisions corresponding to a target user sample;
generating, by the processor, an automated recommendation decision for the user profile to perform a routine automation process or at least one step in the routine automation process, wherein the automated recommendation decision is inferred based on execution of a machine learning model configured to map the set of practice decision data to the set of final decisions; and
automatically performing, by the processor, the routine automation process based on the automated recommendation decision.

3. The system of claim 1, wherein the at least one device is any one of a sensor, digital DNA device, mobile device, or fitness band device.

4. The system of claim 1, further comprising provisioning, by the at least one processor, subsets of personalized data, by the user profile, to target devices based on access provisioning permissions.

5. The system of claim 1, further comprising determining, by the at least one processor, a decision that matches a target outcome based on at least one of the determined predictive relationships.

6. The system of claim 1, further comprising generating, by the at least one processor, predictive patterns corresponding to an executed decision based on:
tagging, by the at least one processor, the personalized data with attribute markers comprising at least one of a time marker, a location markers or a target decision marker;
generating, by the at least one processor, a vector between a subset of the personalized data and at least one of the attribute markers; and
determining, by a set of server devices, predictive patterns based on execution of learning operations on a set of the generated vectors.

7. The system of claim 6, further comprising determining, by the at least one processor, an inferred decision based on an application of the learning operations on one or more subset of the personalized data.

8. The system of claim 6, further comprising generating, by the at least one processor, a decision grid based on the generated predictive patterns, wherein the decision grid represents a map of decisions to the generated vectors.

9. The system of claim 6, further comprising mapping, by the at least one processor, the generated vectors to new decisions or new tasks absent from the personalized data of the user profile.

10. The system of claim 9, further comprising determining, by the at least one processor, an inferred decision corresponding.

11. The system of claim 4, further comprising provisioning, by the at least one processor, customized subsets of personalized data based on defined criteria of a personalized data recipient.

12. The system of claim 1, further comprising identifying, by the at least one processor, customized data patterns corresponding to subsets of the set of personalized data corresponding to the user profile and occurrence of periodic events.

13. A method comprising: automatically executing, by a user profile, one or more tasks based on an artificial intelligence assistant configured to:
generating, by the at least one processor, a personalized learning system configured to facilitate decisions and execute automated tasks corresponding to the user profile, wherein the generating the personalized learning system comprises: sourcing, by the at least one processor, a set of personalized data comprising at least one of biometric data, statistical data, or contextual data from at least one device comprising a processor, wherein access to the set of personalized data is controlled by a user profile;
creating, by the at least one processor, a first training set of historical decisions executed by the user profile, wherein the first training set comprises a first subset of the set of personalized data and associated decision processes; training, by the at least one processor, an iterative machine learning model to predict decisions of the user profile based on the first training set; determining, by the at least one processor, predictive relationships between subsets of the set of personalized data and events corresponding to the user profile based on learned relationships, by execution of the iterative machine learning model trained on the first training set, between the subsets of the set of personalized data and historical events corresponding to the user profile;
generating, by the at least one processor, a personal dynamic decision grid configured to score the predictive relationships between unforeseen events and predictive decisions of the user profile, wherein the scores represent a probability of performing respective decisions of the predictive decisions;
generating, by the at least one processor, a customized decision comprising a set of practice decision data coupled to a set of practice scores, wherein a practice grid represents a set of final decisions corresponding to a target user sample;
generating, by the at least one processor, an automated recommendation decision for the user profile to perform a routine automation process or at least one step in the routine automation process,
wherein the automated recommendation decision is inferred based on execution of another machine learning model configured to map the set of practice decision data to the set of final decisions; and automatically, by the at least one processor, performing the routine automation process based on the automated recommendation decision.

14. The method of claim 13, further comprising, provisioning, by the at least one processor, an automatically curated subset of the set of personalized data to an external device based on permissions of the user profile.

15. The method of claim 13, further comprising automatically executing, by the at least one processor, or recommending a series of steps corresponding to the recommended user profile decisions.

16. The method of claim 13, further comprising generating, by the at least one processor, sets of anonymized personalized data configured to:
propagate a self-learning neural network configured to determine decisions customized to a user profile preference as compared to an external device preference.

17. The method of claim 13, further comprising storing, by the at least one processor, a subset of personalized data at a device executing an interface of the user profile and storing another subset of personalized data within an encrypted database.

18. The method of claim 13, further comprising:
summarizing, by the at least one processor, scores associated with historical personalized data subsets; and
generating, by the at least one processor, new scores corresponding to newly generated personalized data subsets based on insights from the summarized scores.

19. The method of claim 18, wherein the machine learning model executes, by the at least one processor, iterative learning techniques configured to continually extract insights from the newly generated personalized data and the historical personalized data subsets.

20. The method of claim 13, further comprising communicative coupling, by the at least one processor, to networked devices to enable the sourcing sets of personalized data simultaneously from the networked devices.

* * * * *